(12) United States Patent
Sakaguchi et al.

(10) Patent No.: US 10,250,830 B2
(45) Date of Patent: Apr. 2, 2019

(54) SOLID-STATE IMAGING DEVICE, IMAGE READING DEVICE, AND IMAGE FORMING APPARATUS

(71) Applicants: Shinji Sakaguchi, Osaka (JP); Tohru Kanno, Kanagawa (JP)

(72) Inventors: Shinji Sakaguchi, Osaka (JP); Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/447,854

(22) Filed: Mar. 2, 2017

(65) Prior Publication Data

US 2017/0272671 A1    Sep. 21, 2017

(30) Foreign Application Priority Data

Mar. 15, 2016 (JP) ................. 2016-051443

(51) Int. Cl.

| | | |
|---|---|---|
| *H04N 9/64* | (2006.01) | |
| *H04N 5/365* | (2011.01) | |
| *H04N 5/369* | (2011.01) | |
| *H04N 5/378* | (2011.01) | |
| *H04N 5/374* | (2011.01) | |

(52) U.S. Cl.
CPC ......... *H04N 5/3656* (2013.01); *H04N 5/3692* (2013.01); *H04N 5/3696* (2013.01); *H04N 5/374* (2013.01); *H04N 5/378* (2013.01)

(58) Field of Classification Search
CPC ........ H04N 5/357; H04N 5/361; H04N 5/365; H04N 5/3651; H04N 5/3655; H04N 5/3658

USPC ......................................... 348/241, 243, 245
See application file for complete search history.

(56) References Cited

U.S. PATENT DOCUMENTS

| | | | | |
|---|---|---|---|---|
| 5,355,164 A | * | 10/1994 | Shimoyama | ........... H04N 5/361 348/243 |
| 8,310,568 B2 | * | 11/2012 | Taguchi | ............... H04N 5/2176 348/229.1 |
| 2002/0140830 A1 | * | 10/2002 | Shirakawa | ........... H04N 5/2176 348/245 |

(Continued)

FOREIGN PATENT DOCUMENTS

| | | |
|---|---|---|
| JP | 2002-010078 | 1/2002 |
| JP | 2009-077047 | 4/2009 |
| JP | 2014-030274 | 2/2014 |

*Primary Examiner* — Anthony J Daniels
(74) *Attorney, Agent, or Firm* — Oblon, McClelland, Maier & Neustadt, L.L.P.

(57) ABSTRACT

A solid-state imaging device includes: a valid area including pixels that are not shielded from light; a first light-blocked area and a second light-blocked area each including pixels that are shielded from light; an analog-to-digital converting unit to convert the electric charge accumulated by the pixels belonging to the first light-blocked area, the valid area, and the second light-blocked area, to image data at a time; a signal reading unit to read light-blocked data obtained from the first light-blocked area and the second light-blocked area, and valid data obtained from the valid area, in units of pixels; a reference black level estimating unit to estimate a reference black level of the light-blocked data; and a level correction unit to correct, based on the estimated reference black level, a size of the valid data obtained simultaneously with the light-blocked data used in estimating the reference black level.

6 Claims, 11 Drawing Sheets

(56) References Cited

U.S. PATENT DOCUMENTS

| | | | |
|---|---|---|---|
| 2006/0022862 A1* | 2/2006 | Egawa | H03M 1/123 |
| | | | 341/155 |
| 2008/0198266 A1* | 8/2008 | Kurane | H04N 9/67 |
| | | | 348/557 |
| 2009/0160979 A1* | 6/2009 | Xu | H04N 5/361 |
| | | | 348/243 |
| 2010/0128148 A1* | 5/2010 | Yamauchi | H04N 5/357 |
| | | | 348/241 |
| 2012/0081566 A1* | 4/2012 | Cote | H04N 5/2256 |
| | | | 348/222.1 |

* cited by examiner

SOLID-STATE IMAGING DEVICE, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2016-051443, filed on Mar. 15, 2016, in the Japan Patent Office, the entire disclosure of which is hereby incorporated by reference herein.

BACKGROUND

Technical Field

The present invention relates to a solid-state imaging device, an image reading device, and an image forming apparatus.

Description of the Related Art

A solid-state image sensor represented by a complementary metal oxide semiconductor (CMOS) image sensor is used in various imaging devices such as video cameras, digital cameras, copy machines, and scanners.

Such a solid-state image sensor has a configuration where a plurality of photoelectric transducers generating electric charge in accordance with the amount of incident light is arranged in one line (linear image sensor) or a plurality of lines (area image sensor), and outputs an electric signal converted from the electric charge accumulated by each photoelectric transducer (pixel). In the process of generating electric charge and converting the electric charge to an electric signal, noise may occur due to variations among the pixels. Thus, a reference level (reference black level) of an electric signal output from the solid-state image sensor when there is no incident light is different in each line and at each time imaging is performed.

SUMMARY

Example embodiments of the present invention include a solid-state imaging device including a solid-state image sensor in which a plurality of pixels are arranged along at least one direction, the pixels to convert incident light to electric charge whose amount is in accordance with the amount of the incident light and to accumulate the electric charge. The device includes: a valid area including pixels that are not shielded from light; a first light-blocked area including pixels that are shielded from light, the pixels being arranged at one of two end portions of the valid area; a second light-blocked area including pixels that are shielded from light, the pixels being arranged at the other end portion of the valid area; an analog-to-digital converting unit to convert the electric charge accumulated by pixels belonging to the first light-blocked area, the valid area, and the second light-blocked area, to image data at least at a time; a signal reading unit to read, among items of the image data, light-blocked data obtained from the first light-blocked area and the second light-blocked area, and valid data obtained from the valid area, in units of pixels; a reference black level estimating unit to estimate a reference black level of the light-blocked data whenever the light-blocked data is obtained; and a level correction unit to correct, based on the estimated reference black level, a size of the valid data obtained simultaneously with the light-blocked data used in estimating the reference black level.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
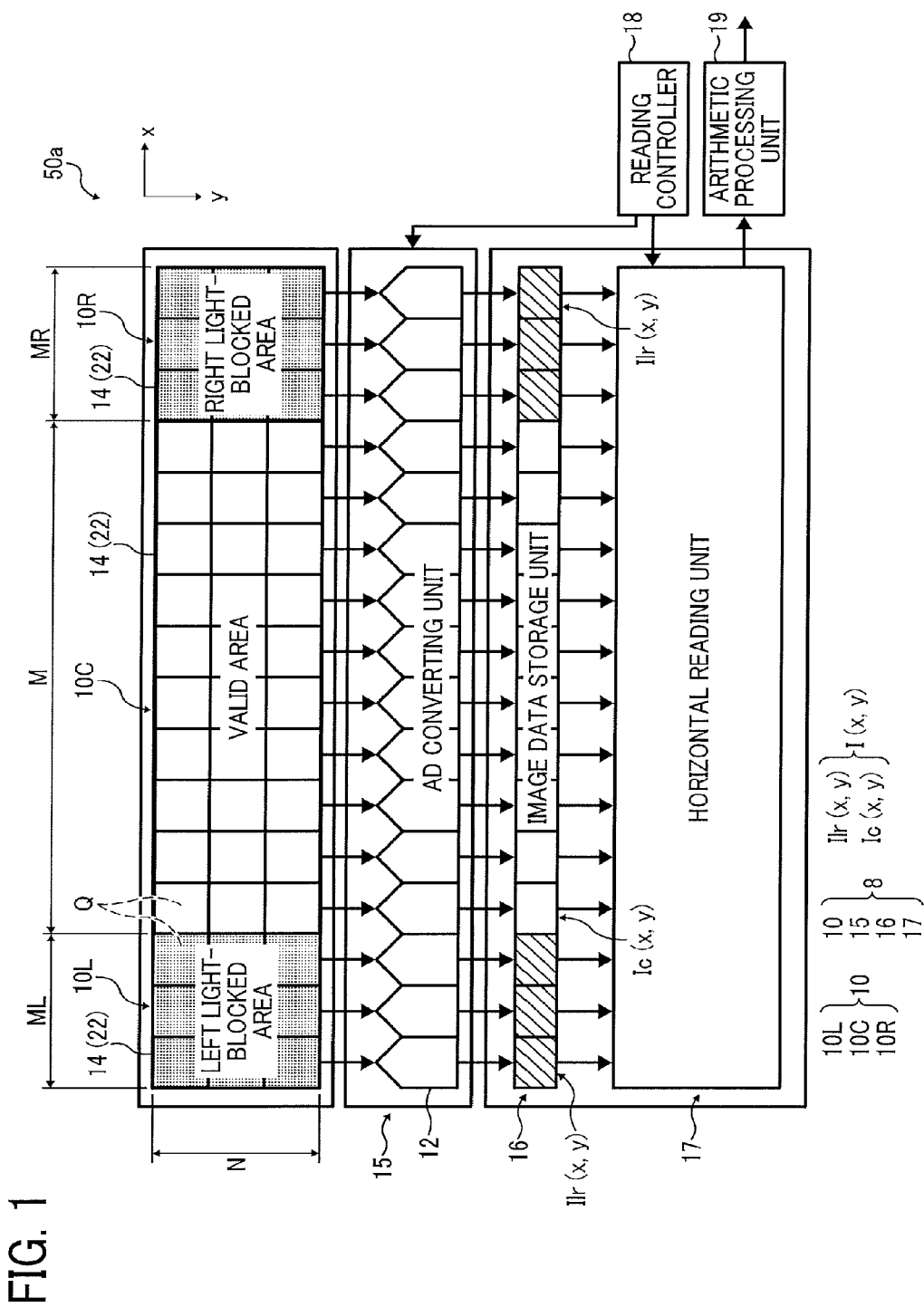
FIG. 1 is a block diagram illustrating the overall configuration of a solid-state imaging device according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a solid-state imaging device according to embodiments will be described with reference to the accompanying drawings.

First Embodiment

The overall configuration of a solid-state imaging device 50a will be described using FIG. 1. FIG. 1 is a block diagram illustrating the overall configuration of the solid-state imaging device 50a according to a first embodiment. The solid-state imaging device 50a includes a pixel area 10, an AD converting unit 15, an image data storage unit 16, a horizontal reading unit 17, a reading controller 18, and an arithmetic processing unit 19. Among these components, the pixel area 10, the AD converting unit 15, the image data storage unit 16, and the horizontal reading unit 17 constitute a solid-state image sensor 8 such as a CMOS image sensor. The reading controller 18 and the arithmetic processing unit 19 may each be implemented by, for example, circuitry.

The pixel area 10 includes a plurality of photoelectric transducers 14. The photoelectric transducers 14 function as a photoelectric converter that converts light incident on the solid-state imaging device 50a to electric charge Q whose amount is in accordance with the amount of received light and accumulates the electric charge Q in the respective photoelectric transducers 14. Each photoelectric transducer 14 will be referred to as a pixel 22 hereinafter. Each pixel 22 accumulates electric charge Q whose amount is greater as a greater amount of light enters as long as the light does not overflow. In the pixel area 10, a plurality of pixels 22 with the same structure is arranged in a two-dimensional matrix in the horizontal direction (x-direction in FIG. 1) and the vertical direction (y-direction in FIG. 1). It is assumed that electric charge Q generated when light is incident over the same period is accumulated in all the pixels 22 included in the pixel area 10.

The pixel area 10 includes a left light-blocked area 10L, a valid area 10C, and a right light-blocked area 10R from left to right. The left light-blocked area 10L includes horizontal ML pixels and vertical N pixels. The surface of pixels 22 belonging to the left light-blocked area 10L is shielded from light by a metal layer or the like. Therefore, the pixels 22 belonging to the left light-blocked area 10L accumulate electric charge Q whose amount is the same as that when no light falls even when light is actually incident. The left light-blocked area 10L corresponds to a first light-blocked area according to an embodiment of the present invention.

The valid area 10C is located adjacent to the right end portion of the left light-blocked area 10L, and includes horizontal M pixels and vertical N pixels. The surface of pixels 22 belonging to the valid area 10C is not shielded from light. Therefore, the pixels 22 belonging to the valid area 10C accumulate electric charge Q whose amount is in accordance with the amount of incident light when light is incident.

The right light-blocked area 10R is located adjacent to the right end portion of the valid area 10C, and includes horizontal MR pixels and vertical N pixels. Pixels belonging to the right light-blocked area 10R have the same structure as the pixels 22 belonging to the left light-blocked area 10L. The right light-blocked area 10R corresponds to a second light-blocked area according to an embodiment of the present invention.

The AD converting unit 15 converts an analog voltage signal in accordance with the electric charge Q accumulated in each pixel 22, on which light is incident, to a digital voltage signal (hereinafter simply referred to as an electric signal) at a certain time point designated by the later-described reading controller 18, and outputs the electric signal. The AD converting unit 15 performs AD conversion to convert an analog voltage signal generated by each pixel 22 included in the pixel area 10 to an electric signal using a corresponding one of AD converters 12 in units of columns (combinations of pixels 22 in the y-direction) or in units of multiple columns. In the present embodiment, it is assumed that the signed 12-bit AD converters 12 are used. That is, the ideal AD conversion result obtained by converting an analog voltage signal when there is no incident light serves as 0 least significant bit (LSB), and the ideal AD conversion result obtained by converting an analog voltage signal when there is incident light that saturates each photoelectric transducer 14 serves as +4095 LSB.

It is assumed that, in the solid-state imaging device 50a, a plurality of AD converters 12 simultaneously perform AD conversion to simultaneously (at one time) convert electric charge Q accumulated in pixels 22 belonging to the left light-blocked area 10L, the valid area 10C, and the right light-blocked area 10R on the same line to electric signals. In general, correlated double sampling (CDS) is performed before and after the AD conversion in order to remove noise components generated by the circuit configuration.

The image data storage unit 16 temporarily stores electric signals output as a result of AD conversion performed by the AD converting unit 15 in a memory circuit included in the image data storage unit 16.

In order to convert analog voltage signals generated in the pixel area 10 to electric signals using the AD converters 12 and to store the electric signals, the image data storage unit 16 includes a memory circuit that stores electric signals for the horizontal ML+M+MR pixels and the vertical N pixels. The electric signals stored by the image data storage unit 16 each have a higher voltage as electric charge Q accumulated by each pixel 22 is higher. That is, the electric signals can be regarded to represent the brightness of a range imaged by the pixel area 10. Therefore, each of the electric signals stored in the image data storage unit 16 will be referred to as image data $I(x, y)$ ($0 \leq x \leq ML+M+MR-1$, $0 \leq y \leq N-1$).

Among items of image data $I(x, y)$, image data $I(x, y)$ obtained from the left light-blocked area 10L and the right light-blocked area 10R will be referred to as light-blocked data $Ilr(x, y)$. Among items of image data $I(x, y)$, image data $I(x, y)$ obtained from the valid area 10C will be referred to as valid data $Ic(x, y)$.

The horizontal reading unit 17 reads the image data $I(x, y)$ stored by the image data storage unit 16 in units of pixels in response to an instruction from the later-described reading controller 18, and shifts the read image data $I(x, y)$ in the x-direction from the left end to the right end. The horizontal reading unit 17 corresponds to a signal reading unit according to an embodiment of the present invention.

The reading controller 18 generates and outputs later-described various control signals, and gives an instruction to the horizontal reading unit 17 to read the image data $I(x, y)$ stored by the image data storage unit 16. The reading controller 18 also gives an instruction to the AD converting unit 15 to convert electric charge Q accumulated by each pixel 22 to an electric signal.

For the image data $I(x, y)$ read by the horizontal reading unit 17, the arithmetic processing unit 19 calculates, for each line of image data $I(x, y)$, a reference black level Bref, which is the signal level of light-blocked data $Ilr(x, y)$ obtained from pixels 22 belonging to the left light-blocked area 10L and the right light-blocked area 10R. On the basis of the calculated reference black level Bref, the arithmetic processing unit 19 performs black level correction to correct the signal level of valid data Ic(x, y) obtained from pixels 22 belonging to the valid area 10C on this line. The detailed operation of the arithmetic processing unit 19, including the method of calculating the reference black level Bref, will be described later.

Configuration of Image Data Storage Unit and Horizontal Reading Unit

Figure 2:
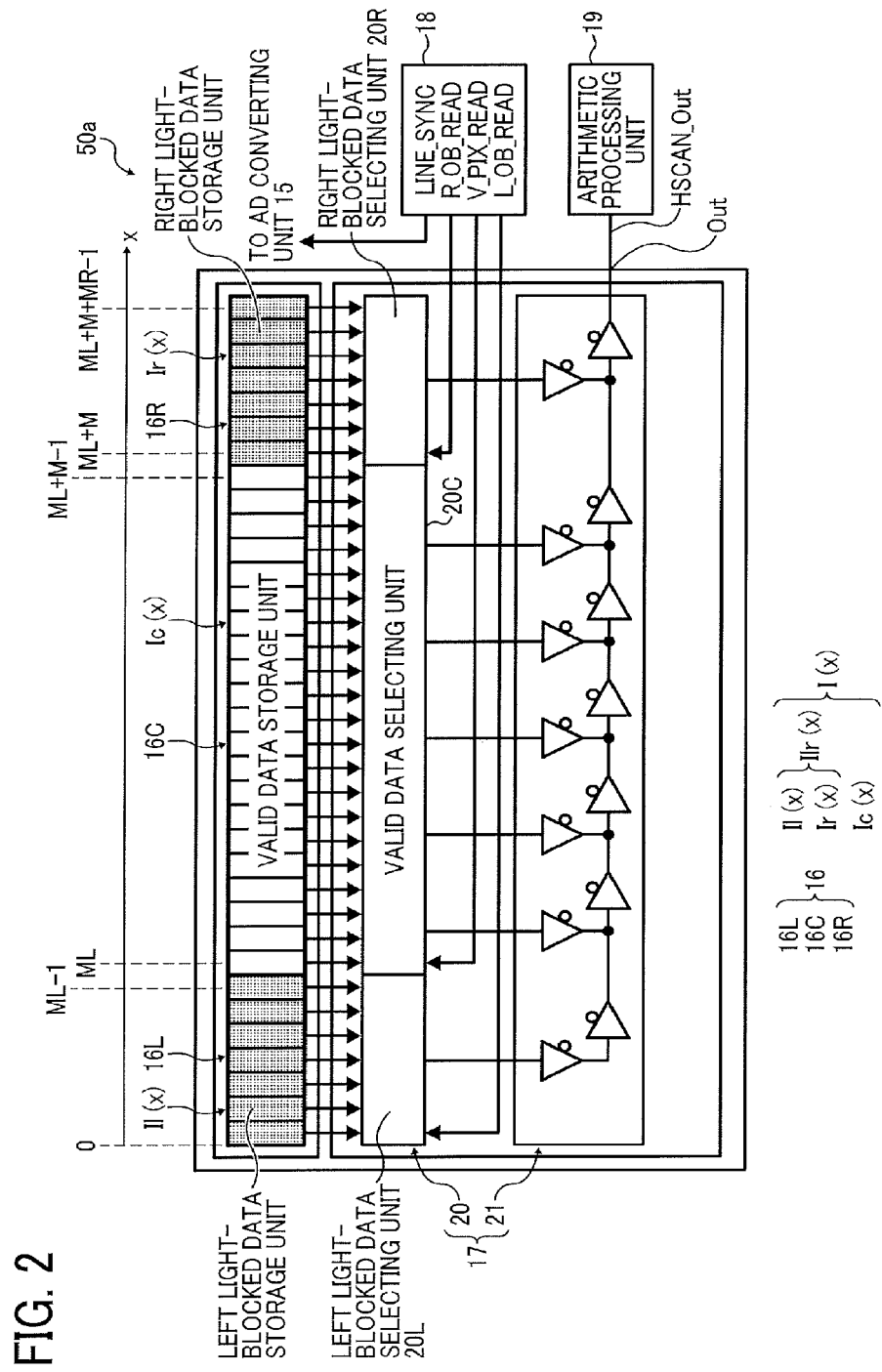
FIG. 2 is a block diagram illustrating the detailed configuration of an image data storage unit and a horizontal reading unit of the solid-state imaging device.

Next, the detailed configuration of the image data storage unit 16 and the horizontal reading unit 17 in the solid-state imaging device 50a will be described using FIG. 2. FIG. 2 is a block diagram illustrating the detailed configuration of the image data storage unit 16 and the horizontal reading unit 17 of the solid-state imaging device 50a. To simplify the description, FIG. 2 illustrates an exemplary configuration where only one line of pixels 22 is arranged in the pixel area 10 illustrated in FIG. 1. The following description will discuss image data of this one-line configuration. Therefore, image data I(x, y) will be represented as I(x) ($0 \leq x \leq ML+M+MR-1$). Moreover, light-blocked data is represented as Ilr(x), and valid data is represented as Ic(x). Among items of light-blocked data Ilr(x), light-blocked data obtained from the left light-blocked area 10L will be denoted as left light-blocked data Il(x), and light-blocked data obtained from the right light-blocked area 10R will be denoted as right light-blocked data Ir(x).

The image data storage unit 16 includes a left light-blocked data storage unit 16L, a valid data storage unit 16C, and a right light-blocked data storage unit 16R.

The left light-blocked data storage unit 16L stores left light-blocked data Il(x) ($0 \leq x \leq ML-1$) based on electric charge Q accumulated by pixels 22 belonging to the left light-blocked area 10L illustrated in FIG. 1. The valid data storage unit 16C stores valid data Ic(x) ($ML \leq x \leq ML+M-1$) based on electric charge Q accumulated by pixels 22 belonging to the valid area 10C illustrated in FIG. 1. The right light-blocked data storage unit 16R stores right light-blocked data Ir(x) ($ML+M \leq x \leq ML+M+MR-1$) based on electric charge Q accumulated by pixels 22 belonging to the right light-blocked area 10R illustrated in FIG. 1.

The horizontal reading unit 17 includes a data selecting unit 20 and a data transfer unit 21. The horizontal reading unit 17 performs image data reading to read the image data I(x) stored by the image data storage unit 16 in response to an instruction from the reading controller 18.

The data selecting unit 20 includes a left light-blocked data selecting unit 20L, a valid data selecting unit 20C, and a right light-blocked data selecting unit 20R. The left light-blocked data selecting unit 20L selects and reads the left light-blocked data Il(x) stored by the left light-blocked data storage unit 16L. The valid data selecting unit 20C selects and reads the valid data Ic(x) stored by the valid data storage unit 16C. The right light-blocked data selecting unit 20R selects and reads the right light-blocked data Ir(x) stored by the right light-blocked data storage unit 16R.

The data selecting unit 20 sequentially transfers the image data I(x) stored by the image data storage unit 16 to the data transfer unit 21 from the left end to the right end on the basis of the pulse generation timing of reading start signals (a right light-blocked area reading start signal R_OB_READ, a valid area reading start signal V_PIX_READ, and a left light-blocked area reading start signal L_OB_READ) output by the reading controller 18. As illustrated in FIG. 2, among the reading start signals, the left light-blocked area reading start signal L_OB_READ is input to the left light-blocked data selecting unit 20L. The valid area reading start signal V_PIX_READ is input to the valid data selecting unit 20C, and the right light-blocked area reading start signal R_OB_READ is input to the right light-blocked data selecting unit 20R.

The right light-blocked area reading start signal R_OB_READ is a pulse signal that gives an instruction to start reading the right light-blocked data Ir(x) stored by the right light-blocked data storage unit 16R. The left light-blocked area reading start signal L_OB_READ is a pulse signal that gives an instruction to start reading the left light-blocked data Il(x) stored by the left light-blocked data storage unit 16L. The valid area reading start signal V_PIX_READ is a pulse signal that gives an instruction to start reading the valid data Ic(x) stored by the valid data storage unit 16C.

For example, among the three components 20L, 20C, and 20R of the data selecting unit 20, the right light-blocked data selecting unit 20R selects, upon detection of a pulse signal of the right light-blocked area reading start signal R_OB_READ, the right light-blocked data Ir(x) corresponding to $x=ML+M$, stored at the left end of the right light-blocked data storage unit 16R, among items of right light-blocked data Ir(x) stored by the right light-blocked data storage unit 16R.

The right light-blocked data selecting unit 20R transfers the selected right light-blocked data Ir(x) to the data transfer unit 21. Next, the right light-blocked data selecting unit 20R selects the right light-blocked data Ir(x) obtained from a pixel 22 corresponding to $x=ML+M+1$, which is second from the left of the right light-blocked data storage unit 16R, and transfers the selected right light-blocked data Ir(x) to the data transfer unit 21.

The left light-blocked data selecting unit 20L and the valid data selecting unit 20C operate like the right light-blocked data selecting unit 20R.

The data transfer unit 21 shifts the image data I(x), transferred from the data selecting unit 20, from the left end to the right end. This data shifting is performed by a shift register configured by connecting a plurality of flip-flops, for example. Items of right light-blocked data Ir(x) stored by the right light-blocked data storage unit 16R are output sequentially from the left end to the right end as an image output signal HSCAN_Out output by the data transfer unit 21 from an output terminal OUT. Likewise, items of left light-blocked data Il(x) stored by the left light-blocked data storage unit 16L and items of valid data Ic(x) stored by the valid data storage unit 16C are output sequentially from the left end to the right end as an image output signal HSCAN_Out on the basis of the pulse generating timing of the left light-blocked area reading start signal L_OB_READ and the valid area reading start signal V_PIX_READ.

Image Data Reading

Figure 3:
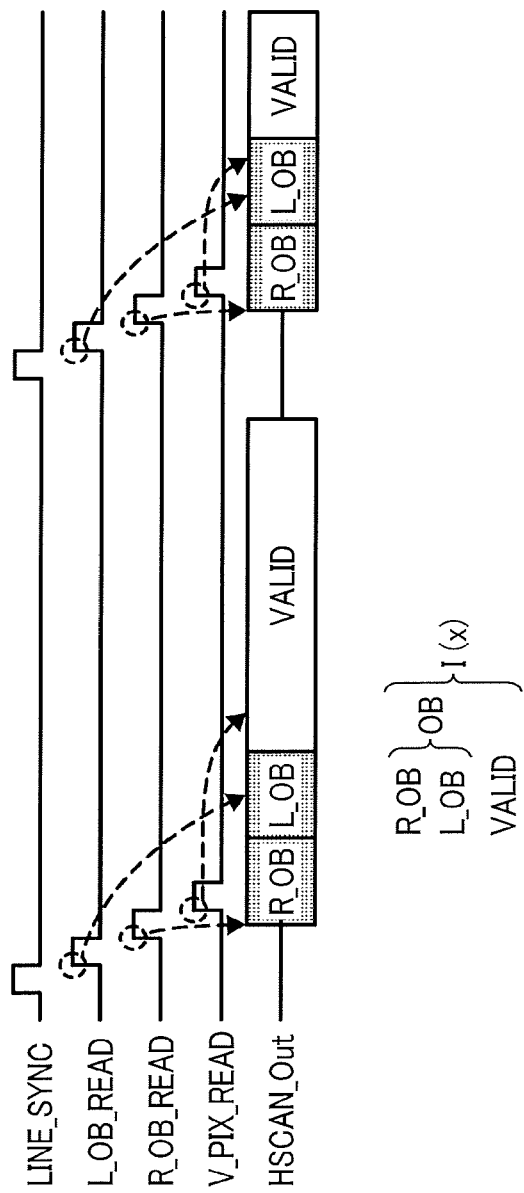
FIG. 3 is a timing chart of image data reading performed by a reading controller and the horizontal reading unit of the solid-state imaging device.

Next, the control timing of image data reading performed by the reading controller 18 and the horizontal reading unit 17 will be described using FIGS. 1 to 3. FIG. 3 is a timing chart of image data reading performed by the above-described reading controller 18 and horizontal reading unit 17.

As illustrated in FIG. 2, the reading controller 18 generates and outputs a horizontal sync signal LINE_SYNC, and the reading start signals (left light-blocked area reading start signal L_OB_READ, valid area reading start signal V_PIX_READ, and right light-blocked area reading start signal R_OB_READ) in synchronization with the horizontal sync signal LINE_SYNC. The horizontal sync signal LINE_SYNC is input to the AD converting unit 15 in FIG. 1. The reading start signals are input to the data selecting unit 20.

As described above, the reading start signals (left light-blocked area reading start signal L_OB_READ, valid area reading start signal V_PIX_READ, and right light-blocked area reading start signal R_OB_READ) give instructions to start transferring the image data I(x) stored by the image data storage unit 16 to the data transfer unit 21.

The horizontal sync signal LINE_SYNC is a signal that indicates the cycle of reading the image data I(x) stored by the image data storage unit 16 in FIG. 2. Whenever the pulse of the horizontal sync signal LINE_SYNC is generated, the AD converting unit 15 in FIG. 1 converts the electric charge Q accumulated by each pixel 22 of the solid-state imaging device 50a to an electric signal, and stores the electric signal as image data I(x) in the image data storage unit 16. Therefore, the image data I(x) stored in the image data storage unit 16 is updated at the same interval as the pulse interval of the horizontal sync signal LINE_SYNC.

On receipt of the reading start signals (R_OB_READ, V_PIX_READ, and L_OB_READ) output by the reading controller 18, the data selecting unit 20 sequentially outputs the image data I(x) (right light-blocked data Ir(x), valid data Ic(x), and left light-blocked data Il(x)) stored by the image data storage unit 16 connected to a position in accordance with the type of reading start signal, among the three components 20L, 20C, and 20R of the data selecting unit 20, to the data transfer unit 21 from the left end to the right end.

The time required for shifting the image data I(x) from the left end to the right end, which is performed by the data transfer unit 21, is different in accordance with the distance from the output terminal Out of the data transfer unit 21 outputting the image output signal HSCAN_Out, that is, the number of stages of the shift register performing the data transfer.

For example, in the solid-state imaging device 50a in FIG. 2, the time from the pulse generation of the left light-blocked area reading start signal L_OB_READ to when the left light-blocked data Il(x) stored by the left light-blocked data storage unit 16L is output from the data transfer unit 21 is the greatest since the number of stages of the shift register is the greatest. In contrast, the time from the pulse generation of the right light-blocked area reading start signal R_OB_READ to when the right light-blocked data Ir(x) stored by the right light-blocked data storage unit 16R is output from the data transfer unit 21 is the least since the number of stages of the shift register is the smallest.

As illustrated in FIG. 3, in the solid-state imaging device 50a according to the present embodiment, the data transfer unit 21 reads the image data I(x) in the following order: the right light-blocked data Ir(x) stored by the right light-blocked data storage unit 16R (simply referred to as right light-blocked data R_OB when it is unnecessary to take into consideration the position coordinates), the left light-blocked data Il(x) stored by the left light-blocked data storage unit 16L (simply referred to as left light-blocked data L_OB when it is unnecessary to take into consideration the position coordinates), and the valid data Ic(x) stored by the valid data storage unit 16C (simply referred to as valid data VALID when it is unnecessary to take into consideration the position coordinates).

That is, the reading controller 18 first gives an instruction to start reading the left light-blocked data L_OB, which takes the greatest reading time, from the left light-blocked data storage unit 16L by outputting the left light-blocked area reading start signal L_OB_READ. Next, the reading controller 18 gives an instruction to start reading the right light-blocked data R_OB, which takes the least reading time, from the right light-blocked data storage unit 16R by outputting the right light-blocked area reading start signal R_OB_READ. Finally, the reading controller 18 gives an instruction to start reading the valid data VALID from the valid data storage unit 16C by outputting the valid area reading start signal V_PIX_READ.

When the reading controller 18 outputs these reading start signals (R_OB_REAd, V_PIX_READ, and L_OB_READ) at these time points, as illustrated in FIG. 3, the data transfer unit 21 reads the image data I(x) as an image output signal HSCAN_Out in the following order: the right light-blocked data R_OB, the left light-blocked data L_OB, and the valid data VALID.

Although FIG. 3 illustrates the case where the left light-blocked data L_OB is output after the right light-blocked data R_OB, this order may be changed such that the right light-blocked data R_OB is output after the left light-blocked data L_OB. In the following description, the right light-blocked data R_OB and the left light-blocked data L_OB are collectively referred to as light-blocked data OB.

The above-described reading order can be realized when the reading controller 18 adjusts the output timing of the reading start signals (left light-blocked area reading start signal L_OB_READ, valid area reading start signal V_PIX_READ, and right light-blocked area reading start signal R_OB_READ). That is, by taking into consideration the total number of pixels 22 in the x-direction included in the pixel area 10, a time delay that occurs in data transfer performed by the data transfer unit 21, and the position at which the output terminal Out of the data transfer unit 21 is located, the output timing of the reading start signals can be set in advance such that the image data I(x) will be read in a certain order. In accordance with the set output timing, the reading controller 18 outputs the reading start signals, as illustrated in FIG. 3.

Configuration and Operation of Arithmetic Processing Unit

Figure 4:
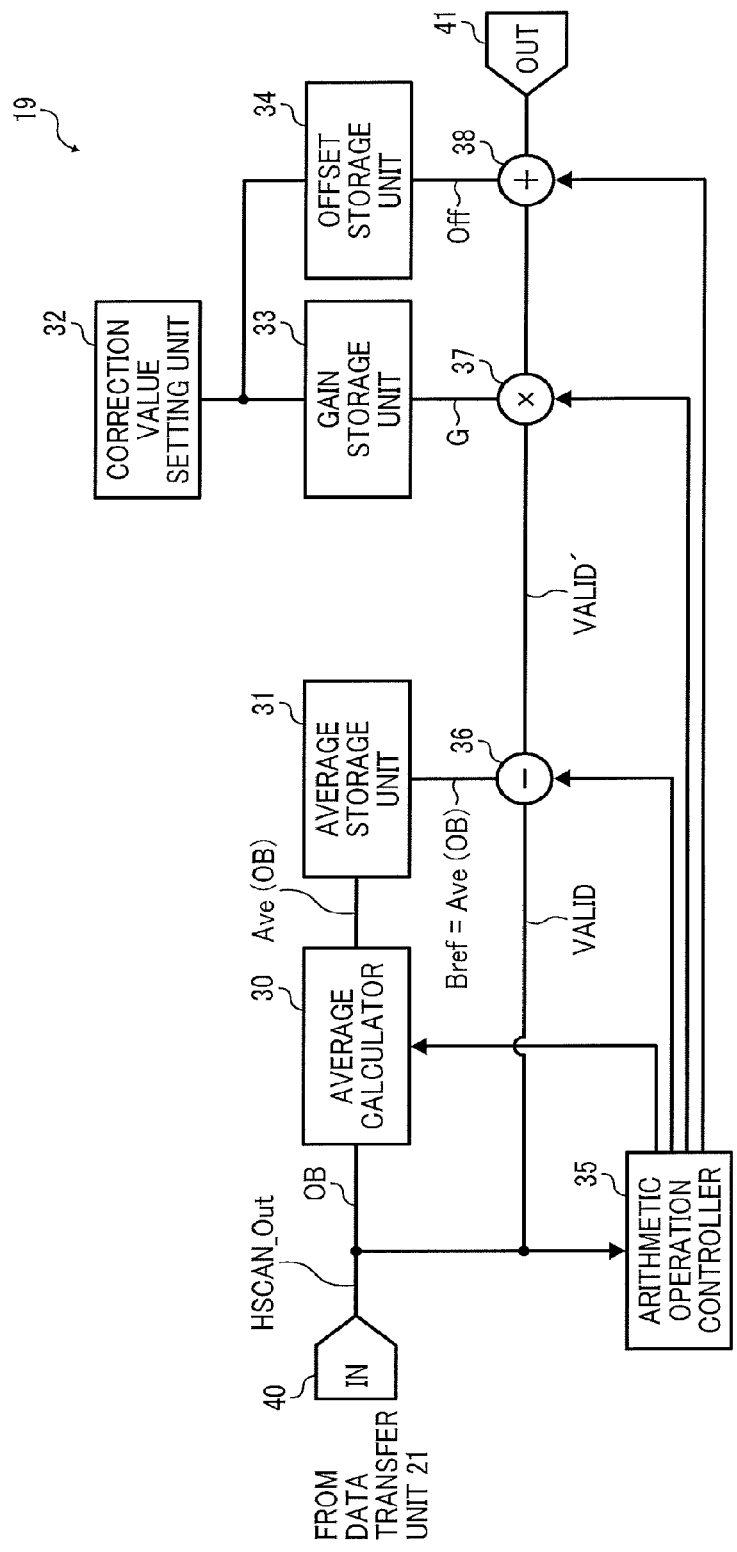
FIG. 4 is a block diagram illustrating the detailed configuration of an arithmetic processing unit of the solid-state imaging device.

Next, the detailed configuration and the operation of the arithmetic processing unit 19 will be described using FIG. 4. FIG. 4 is a block diagram illustrating the detailed configuration of the arithmetic processing unit 19. The arithmetic processing unit 19 includes an arithmetic operation controller 35, an average calculator 30, a subtraction processor 36, a multiplication processor 37, an addition processor 38, an average storage unit 31, a correction value setting unit 32, a gain storage unit 33, an offset storage unit 34, an input terminal 40, and an output terminal 41.

The arithmetic operation controller 35 controls the components of the arithmetic processing unit 19 in accordance with the timing of the image output signal HSCAN_Out input from the input terminal 40. That is, it is assumed that the arithmetic operation controller 35 monitors the image output signal HSCAN_Out and grasps from which pixel 22 the image output signal HSCAN_Out has been received.

The average calculator 30 performs the average calculation to calculate the average Ave(OB) of items of light-blocked data OB for one line, which are part of the image output signal HSCAN_Out. The average calculator 30 corresponds to a reference black level estimating unit according to an embodiment of the present invention. The average calculation will be described in detail later.

The average storage unit 31 stores the average Ave(OB) calculated by the average calculator 30.

The correction value setting unit 32 sets a gain value G defining the magnification by which the valid data VALID is multiplied, and an offset value Off to be added to the valid data VALID, in order to convert the valid data VALID to a form that is easy to use in accordance with an application connected to a subsequent stage of the arithmetic processing unit 19. The specific gain value G and the specific offset value Off are appropriately set in accordance with the use of the valid data VALID.

The gain storage unit 33 stores the gain value G set by the correction value setting unit 32.

The offset storage unit 34 stores the offset value Off set by the correction value setting unit 32.

The subtraction processor 36 reads the valid data VALID for one line, which are part of the image output signal HSCAN_Out, and performs the subtraction to subtract the average Ave(OB), stored by the average storage unit 31, from the read valid data VALID. The subtraction processor 36 corresponds to a level correction unit according to an embodiment of the present invention. An output of the subtraction processor 36 serves as corrected valid data VALID'. The subtraction will be described in detail later.

The multiplication processor 37 performs multiplication to multiply the corrected valid data VALID' by the gain value G stored by the gain storage unit 33.

The addition processor 38 performs addition to add the offset value Off, stored by the offset storage unit 34, to the multiplication result obtained by the multiplication processor 37.

Average Calculation

Hereinafter, the details of the average calculation performed by the average calculator 30 will be described in detail. Because the light-blocked data OB is image data obtained from the light-blocked pixels 22, ideally image data whose level is 0 LSB should be obtained. However, for example, if the light-blocked data OB is affected by the manufacturing variations of the photoelectric transducers 14 or some noise generated in the course of conversion to electric signals from the photoelectric transducers 14 through the AD converting unit 15, variations occur in the light-blocked data OB. To alleviate the effect of these variations, the average of the light-blocked data OB is calculated. Furthermore, if pixels 22 (photoelectric transducers 14) belonging to the left light-blocked area 10L and the right light-blocked area 10R include one or more defective pixels 22, the average calculation is effective to alleviate the effect of these defective pixels. The average Ave(OB) calculated by the average calculation can be regarded as a reference black level Bref, which is a signal level that the light-blocked data OB stored by the left light-blocked data storage unit 16L and the right light-blocked data storage unit 16R should have.

To calculate the reference black level Bref from the light-blocked data OB stored by the left light-blocked data storage unit 16L and the right light-blocked data storage unit 16R, only the light-blocked data OB in a partial range of the entire light-blocked data OB stored by the left light-blocked data storage unit 16L and the right light-blocked data storage unit 16R may be subjected to the average calculation.

For example, when attention is paid to image data I(x) at the left end of the left light-blocked data storage unit 16L, because there is no pixel 22 on the left side of the left light-blocked data storage unit 16L, there is no image data I(x). Although all the photoelectric transducers 14 arranged in the pixel area 10 have the same structure, image data I(x) obtained from a photoelectric transducer 14 at an end portion may vary, unlike image data I(x) obtained from a photoelectric transducer 14 sandwiched between two photoelectric transducers 14, as described above. This is because of design elements such as the wiring layout in the solid-state image sensor 8.

Image data I(x) at the right end of the left light-blocked data storage unit 16L is adjacent to the valid data storage unit 16C, which is not shielded from light. Therefore, for example, light incident on pixels 22 in the adjacent valid area 10C may leak out and flow into a pixel 22 at the right end of the left light-blocked data storage unit 16L. For that reason, the level of image data I(x) obtained from the pixel 22 at the right end of the left light-blocked data storage unit 16L may be different from the other pixels 22 of the left light-blocked data storage unit 16L.

Therefore, it is preferable to use only a partial range of the left light-blocked data L_OB for the average calculation in order to calculate a more accurate reference black level Bref. It is preferable that, in the left light-blocked data L_OB, the partial range be a range neither adjacent to the outer edge of the pixel area 10 in FIG. 1 nor to the valid area 10C.

The same applies to the right light-blocked data storage unit 16R. It is preferable that a range neither adjacent to an end portion of the pixel area 10 nor to the valid area 10C be subjected to the average calculation. The average calculation ranges set in this manner are stored in the arithmetic operation controller 35. The arithmetic operation controller 35 extracts only image data I(x) within each of the average value calculation ranges from the image output signal HSCAN_Out, and performs the average calculation.

Figure 5:
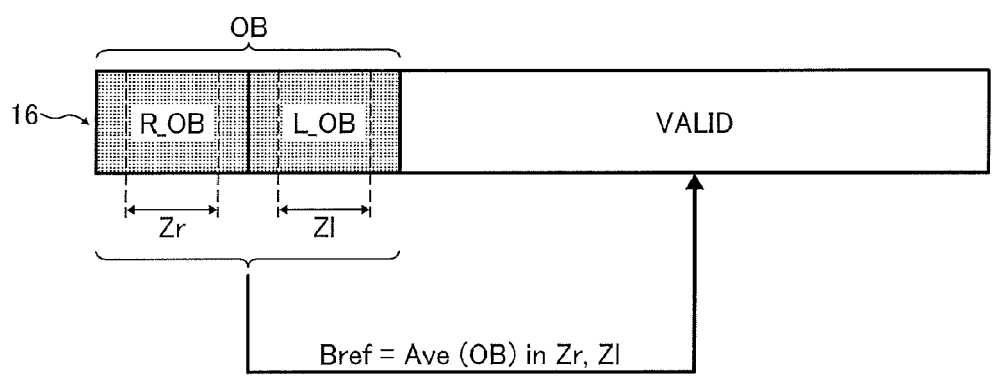
FIG. 5 is a diagram describing the range of light-blocked data selected when calculating a reference black level.

FIG. 5 illustrates an example where an inner area Zr which is a range neither adjacent to an end portion of the pixel area 10 illustrated in FIG. 1 nor to the valid area 10C is set in the interior of the right light-blocked data R_OB. FIG. 5 also illustrates an example where an inner area Zl which is a range neither adjacent to an end portion of the pixel area 10 illustrated in FIG. 1 nor to the valid area 10C is set in the interior of the left light-blocked data L_OB. Among items of light-blocked data OB, only pixels 22 belonging to the inner areas Zr and Zl are used for the average calculation, thereby calculating the average Ave (OB) (within the interior of the inner areas Zr and Zl). Using the average Ave(OB) calculated in this manner as the reference black level Bref, the black level correction of the valid data VALID is performed. Accordingly, a more accurate reference black level Bref can be calculated.

Subtraction

Next, subtraction performed by the subtraction processor 36 will be described. The valid data VALID is data obtained from pixels 22 that are not shielded from light, stored by the valid data storage unit 16C. Therefore, when there is no incident light, 0-LSB data, equivalent to the left light-blocked data L_OB and the right light-blocked data R_OB, is obtained as the valid data VALID. In contrast, when there is strong incident light, such as when there is light whose level is such that the image data I(x) saturates, +4095-LSB data is obtained as the valid data VALID.

However, like the light-blocked data OB, the same applies to valid data VALID obtained from pixels 22 that are not shielded from light in the following case. That is, due to manufacturing variations of the photoelectric transducers 14 or mixed noise components, image data I(x) obtained in a state where there is no incident light becomes deviated from the ideal 0-LSB image data I(x). In the present embodiment, image data I(x) ideally has a resolution of 4096 levels. When image data I(x) obtained by imaging performed in a state where there is no incident light is deviated from 0 LSB, the accuracy of the image data I(x) is deteriorated.

This will be described using a specific example. It is now assumed that a level of +10 LSB is obtained as the average Ave(OB) of the light-blocked data OB. When an image of a bright index is captured, it is assumed that +4095 LSB is obtained as valid data VALID. The reproducibility of image data I(x) is based on the level of a black image. The valid data VALID in this example is not +4095 LSB, but should be considered as +4085 LSB, which is obtained by subtracting 10 LSB from +4095 LSB. In this manner, when the black level serving as a reference of the image data I(x) is deviated, the captured image cannot be accurately reproduced.

To correct this brightness deviation, subtraction is performed to subtract the average Ave(OB) of the light-blocked data OB from the valid data VALID. In the above-described example, the average storage unit 31 stores 10 LSB, which is the average Ave(OB) of the light-blocked data OB, as the reference black level Bref. By subtracting 10 LSB, which is the reference black level Bref, from the valid data VALID, +4095 LSB, obtained as the valid data VALID, is corrected to +4085 LSB serving as the corrected valid data VALID'.

Example of Black Level Correction

Figure 6A:
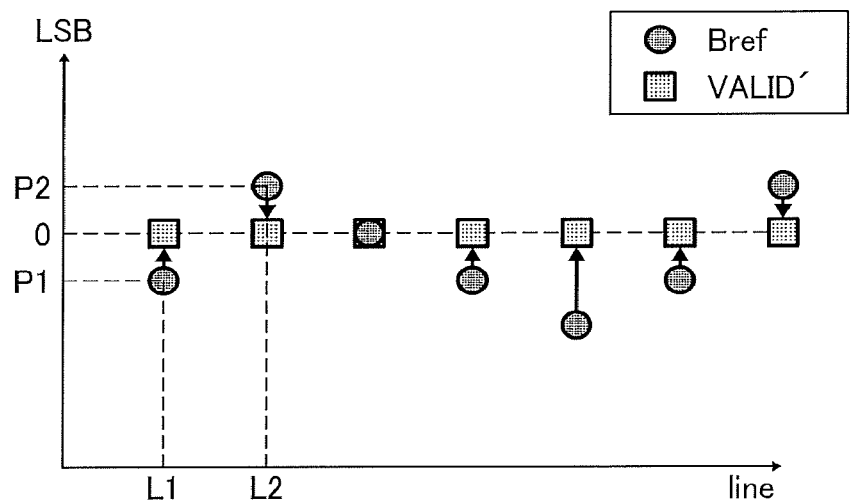
FIGS. 6A and 6B are graphs illustrating examples of black level correction performed by the arithmetic processing unit, including FIG. 6A illustrating an example where correction is performed using the black level of the same line as the reference black level, and FIG. 6B illustrating a comparative example where correction is performed using the black level of one previous line as the reference black level.
Figure 6B:
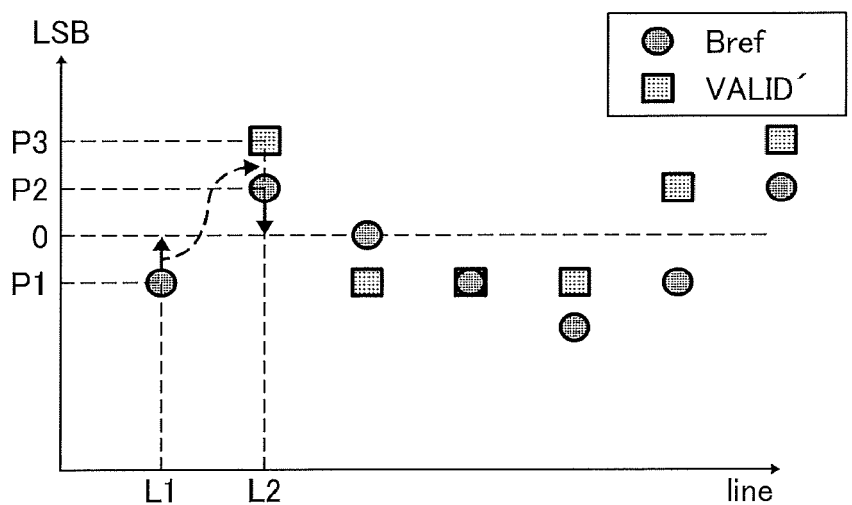

Now using FIGS. 6A and 6B, black level correction performed by the arithmetic processing unit 19 will be described in comparison with black level correction of the related art. FIGS. 6A and 6B illustrate examples of black level correction performed by the arithmetic processing unit 19. Particularly, FIG. 6A illustrates an example of the present embodiment where black level correction is performed using the black level of the same line as the reference black level Bref. FIG. 6B illustrates a comparative example where black level correction is performed using the black level of one previous line as the reference black level Bref. In the examples illustrated in FIGS. 6A and 6B, valid data VALID obtained in a condition where no light is incident on the valid area 10C, that is, an output corresponding to 0 LSB is obtained, is corrected on the basis of the reference black level Bref calculated from light-blocked data OB.

As illustrated in FIG. 6A, it is assumed that the reference black level Bref calculated from light-blocked data OB on different lines (L1, L2, . . . ) of the pixel area 10 is P1, P2, . . . In this manner, the reference black level Bref varies from one line to another.

At this time, valid data VALID of line 1 has a level close to P1, which is the reference black level Bref of line L1. Therefore, by subtracting P1, which is the reference black level Bref of the same line L1, from the valid data VALID, the corrected valid data VALID' becomes 0 LSB, as illustrated in FIG. 6A.

In this manner, when correction is performed using the reference black level Bref calculated from light-blocked data OB of the same line, the varying reference black level Bref is used as a value to be subtracted from when black level correction is performed, thereby canceling out the level variations in the valid data VALID. The corrected valid data VALID' obtained by subtracting the reference black level Bref from the valid data VALID becomes a constant value on the individual lines. That is, even when the reference black level Bref varies in different lines, the corrected valid data VALID' is prevented from varying, thereby obtaining an even image without horizontal stripes.

In contrast, as illustrated in FIG. 6B, when correction is performed on the basis of the reference black level Bref calculated from light-blocked data OB of one previous line, the corrected valid data VALID' does not become 0 LSB.

That is, like FIG. 6A, it is assumed that the reference black level Bref calculated from light-blocked data OB on different lines (L1, L2, . . . ) of the pixel area 10 is P1, P2, . . . At this time, valid data VALID of line 2 has a level close to P2, which is the reference black level Bref of line L2. At this time, by subtracting P1, which is the reference black level Bref of one previous line L1, from the valid data VALID, the corrected valid data VALID' becomes P3, not 0 LSB. The same applies to the other lines. In this manner, when black level correction is performed using the light-blocked data OB of one previous line, the corrected valid data VALID' is not prevented from varying from one line to another. Although FIGS. 6A and 6B illustrate the examples of an area image sensor where the pixel area 10 includes a plurality of lines, the same description holds true in the case of a linear image sensor including a one-line pixel area 10 by replacing the horizontal stripes in FIGS. 6A and 6B with the number of times imaging is performed.

Figure 7:
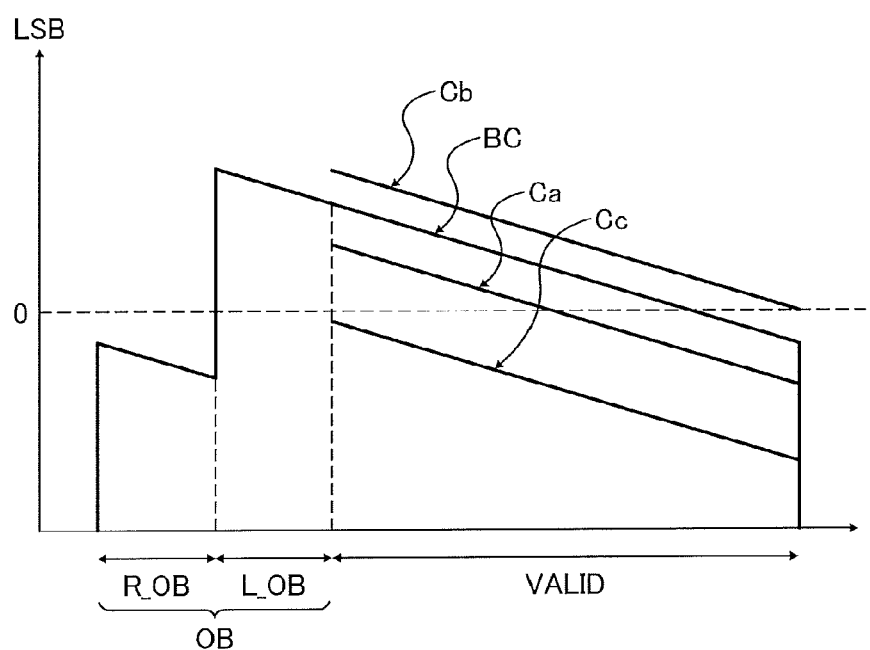
FIG. 7 is a graph describing the effect of performing black level correction using outputs of left and right light-blocked areas.

Next, using FIG. 7, the effect of using both the right light-blocked data R_OB and the left light-blocked data L_OB when performing black level correction of the valid data VALID will be described. FIG. 7 illustrates black level correction of the valid data VALID using the right light-blocked data R_OB and the left light-blocked data L_OB. In FIG. 7, BC denotes to-be-corrected data (before-correction data).

As illustrated in FIG. 7, the correction result Ca in the case of subtracting the average of the light-blocked data OB from the valid data VALID becomes a value closest to 0 LSB, compared with the correction result Cb in the case of subtracting the average of only the right light-blocked data R_OB or the correction result Cc in the case of subtracting the average of only the left light-blocked data L_OB. That is, it becomes clear that the correction effect of black level correction becomes higher when using both the right light-blocked data R_OB and the left light-blocked data L_OB.

The reason for the above can be described as below. That is, a large number of pixels 22 are arranged in the x-direction (row direction) in the valid area 10C. Similarly, a large amount of AD converters 12 are arranged in the row direction. At this time, for example, when a circuit that is the source of noise is located on the left-side portion of the pixel area 10, the degree of effect of noise is different in the left light-blocked data L_OB and the right light-blocked data R_OB since their distances from the noise source are different. Therefore, when black level correction is performed using the average Ave(OB) based only on the light-blocked data (L_OB or R_OB) where the image data I(x) varies greatly due to the effect of the noise source, the correction becomes excessive in the other light-blocked data (L_OB or R_OB) where the image data I(x) varies less, which is not very much affected by the noise source. In contrast, when black level correction is performed using the average Ave(OB) based only on the light-blocked data (L_OB or R_OB) where the image data I(x) varies less, which is not very much affected by the noise source, the correction becomes insufficient in the other light-blocked data (L_OB or R_OB) where the image data I(x) is affected by the noise source. Therefore, the corrected valid data VALID' may result in an uneven image.

Therefore, in the first embodiment, by using the average Ave(OB) of the right light-blocked data R_OB and the left light-blocked data L_OB as the reference black level Bref, even when there is a noise source near the pixel area 10, an even image can be obtained by performing black level correction.

Figure 8A:
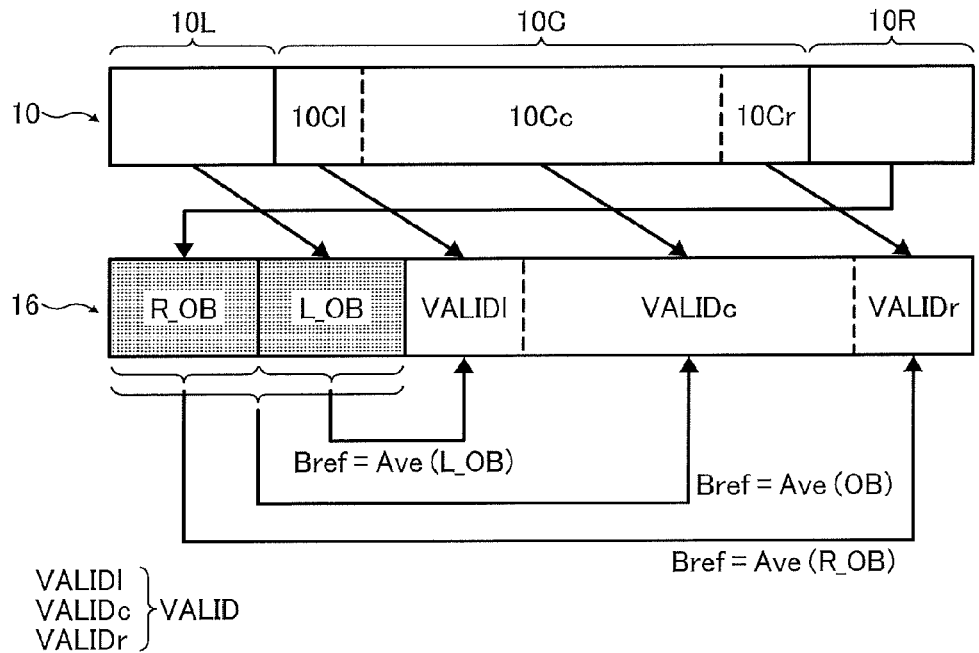
FIGS. 8A and 8B are diagrams describing a process of changing the reference black level used in black level correction in accordance with the position of valid data, including FIG. 8A illustrating an example of changing reference light-blocked data in accordance with the position of valid data, and FIG. 8B illustrating an example of changing the method of referring light-blocked data in accordance with the position of valid data.
Figure 8B:
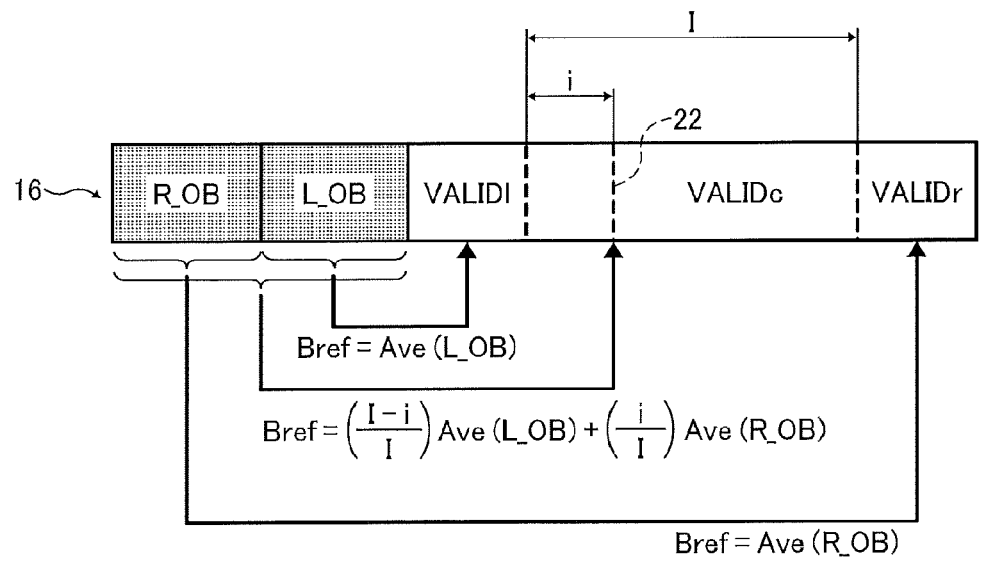

Furthermore, the reference black level Bref may be changed in accordance with the position of a pixel 22 of interest in the to-be-corrected valid data VALID. FIGS. 8A and 8B describe the process of changing the reference black level Bref, used in black level correction, in accordance with the position of the valid data VALID. In particular, FIG. 8A illustrate an example of changing the light-blocked data OB, which is referred to when calculating the reference black level Bref, in accordance with the position of the valid data VALID. FIG. 8B illustrates an example of changing the method of referring to the light-blocked data OB, when calculating the reference black level Bref, in accordance with the position of the valid data VALID.

As illustrated in FIG. 8A, among items of valid data VALID obtained from pixels 22 belonging to the valid area 10C, for left valid data VALIDl obtained from a left-portion valid area 10Cl (first partial valid area), which is a partial area adjacent to the left light-blocked area 10L, black level correction is performed using the average Ave(L_OB) of the left light-blocked data L_OB as the reference black level Bref.

Meanwhile, among items of valid data VALID obtained from pixels 22 belonging to the valid area 10C, for right valid data VALIDr obtained from a right-portion valid area 10Cr (second partial valid area), which is a partial area adjacent to the right light-blocked area 10R, black level correction is performed using the average Ave(R_OB) of the right light-blocked data R_OB as the reference black level Bref.

Finally, among items of valid data VALID obtained from pixels 22 belonging to the valid area 10C, for center valid data VALIDc obtained from a center-portion valid area 10Cc (third partial valid area), which is a partial area neither adjacent to the left light-blocked area 10L nor to the right light-blocked area 10R, black level correction is performed using the average Ave(OB) of the right light-blocked data R_OB and the left light-blocked data L_OB as the reference black level Bref.

In this manner, by changing the reference black level Bref used in black level correction of the valid data VALID in accordance with the position of the to-be-corrected valid data VALID, if the effect of noise is not uniform and variations of the reference black level Bref strikingly appear in a portion near the left end or the right end of the valid data VALID, because the reference black level Bref is adjustable in accordance with the position of a pixel 22, excessive correction or insufficient correction can be prevented from occurring. An even image can be obtained by this black level correction.

In black level correction of the valid data VALID, as illustrated in FIG. 8B, in accordance with the position of a pixel 22 of interest in the center valid data VALIDc, out of the average Ave(L_OB) of the left light-blocked data L_OB and the average Ave(R_OB) of the right light-blocked data R_OB, light-blocked data (L_OB or R_OB) nearer to the pixel 22 of interest may be weighted to calculate the reference black level Bref. That is, as illustrated in FIG. 8B, it is assumed that I denotes the number of pixels belonging to the center valid data VALIDc, and a pixel 22 of interest subjected to black level correction is the i-th pixel 22 from the left of the center valid data VALIDc. At this time, the reference black level Bref for the pixel 22 of interest is a value obtained by multiplying the average Ave(L_OB) of the left light-blocked data L_OB by a weight (I−i)/I and the average Ave(R_OB) of the right light-blocked data R_OB by a weight i/I and adding the multiplied results.

In this manner, the varying effect of noise can be further reduced by performing black level correction based on the reference black level Bref calculated by weighting light-blocked data (L_OB or R_OB) nearer to a pixel 22 of interest in the center valid data VALIDc in accordance with the position of the pixel 22 of interest. Therefore, a more even image can be obtained by black level correction.

Second Embodiment

Next, a solid-state imaging device 50b according to a second embodiment of the present invention will be described using the drawings. The second embodiment includes an AD converting unit with a configuration different from that of the AD converting unit 15 included in the solid-state imaging device 50a in FIG. 1, which is described in the first embodiment. In addition, the reading controller 18 and the arithmetic processing unit 19 have different internal configurations. The configuration of the solid-state imaging device 50b other than those described above is the same as that of the solid-state imaging device 50a.

Figure 9:
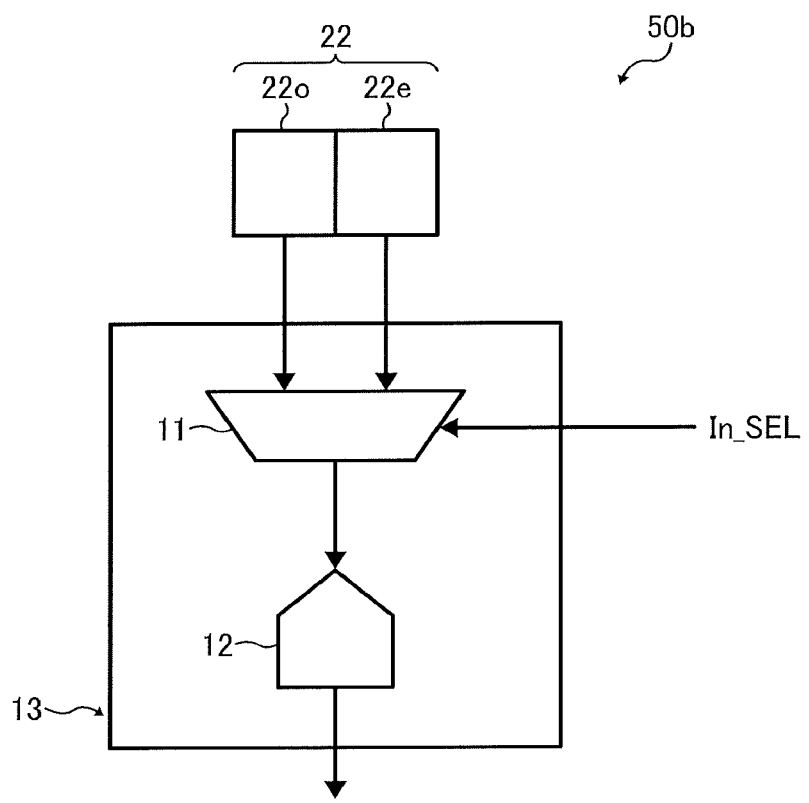
FIG. 9 is a block diagram illustrating the configuration of an analog-to-digital (AD) converting unit of a solid-state imaging device according to a second embodiment.

Using FIG. 9, the configuration of an AD converting unit 13 used in the second embodiment will be described. FIG. 9 is a block diagram illustrating the configuration of the AD converting unit 13. The AD converting unit 13 includes a multiplexer 11 and an AD converter 12. The AD converter 12 has the same configuration as that of the AD converters 12 described in the first embodiment.

The multiplexer 11 receives analog voltage signals output from an odd-number pixel 22o and an even-number pixel 22e, which are two adjacent pixels 22, and selects and outputs one of the analog voltage signals in accordance with a selection control signal In_SEL. The selected analog voltage signal is input to the AD converter 12. Although only one AD converter 12 is illustrated in FIG. 9, actually there are AD converters 12 whose number is in accordance with the total number of pixels 22 included in the pixel area 10.

The selection control signal In_SEL is generated and output by the reading controller 18 (see FIG. 1). The reading controller 18 used in the second embodiment is different from the reading controller 18 used in the first embodiment in the point that the reading controller 18 used in the second embodiment generates and outputs this selection control signal In_SEL.

Using one AD converter 12, the solid-state imaging device 50b performs AD conversion of image data I(x) of the odd-number pixel 22o and image data I(x) of the even-number pixel 22e, which are captured at the same time. Therefore, AD conversion is performed at different times for the odd-number pixel 22o and the even-number pixel 22e. In the present embodiment, it is assumed that AD conversion for the odd-number pixel 22o is performed at a time point t=t0, and AD conversion for the even-number pixel 22e is performed at a time point t=t0+Δt. In this manner, when one AD converter 12 performs AD conversion of outputs of adjacent pixels 22, an area occupied by the AD converting unit 15, described in the first embodiment, can be further reduced. Therefore, the size of and power consumed by the solid-state imaging device 50b can be made smaller than those of the solid-state imaging device 50a.

In an AD converting circuit included in the AD converter 12, AD conversion characteristics may vary due to the effect of noise. That is, even in the case of items of image data I(x) of the same brightness that are captured at the same time, if these items of image data I(x) are subjected to AD conversion at different times, their reference black levels Bref may be different. Thus, in the second embodiment, black level correction is performed by applying different reference black levels Bref for items of image data I(x) of the odd-number pixel 22o and the even-number pixel 22e, which are obtained at different times. A later-described arithmetic processing unit 49 (see FIG. 10) used in the second embodiment has a different configuration for performing this black level correction, compared with the arithmetic processing unit 19 used in the first embodiment.

Figure 10:
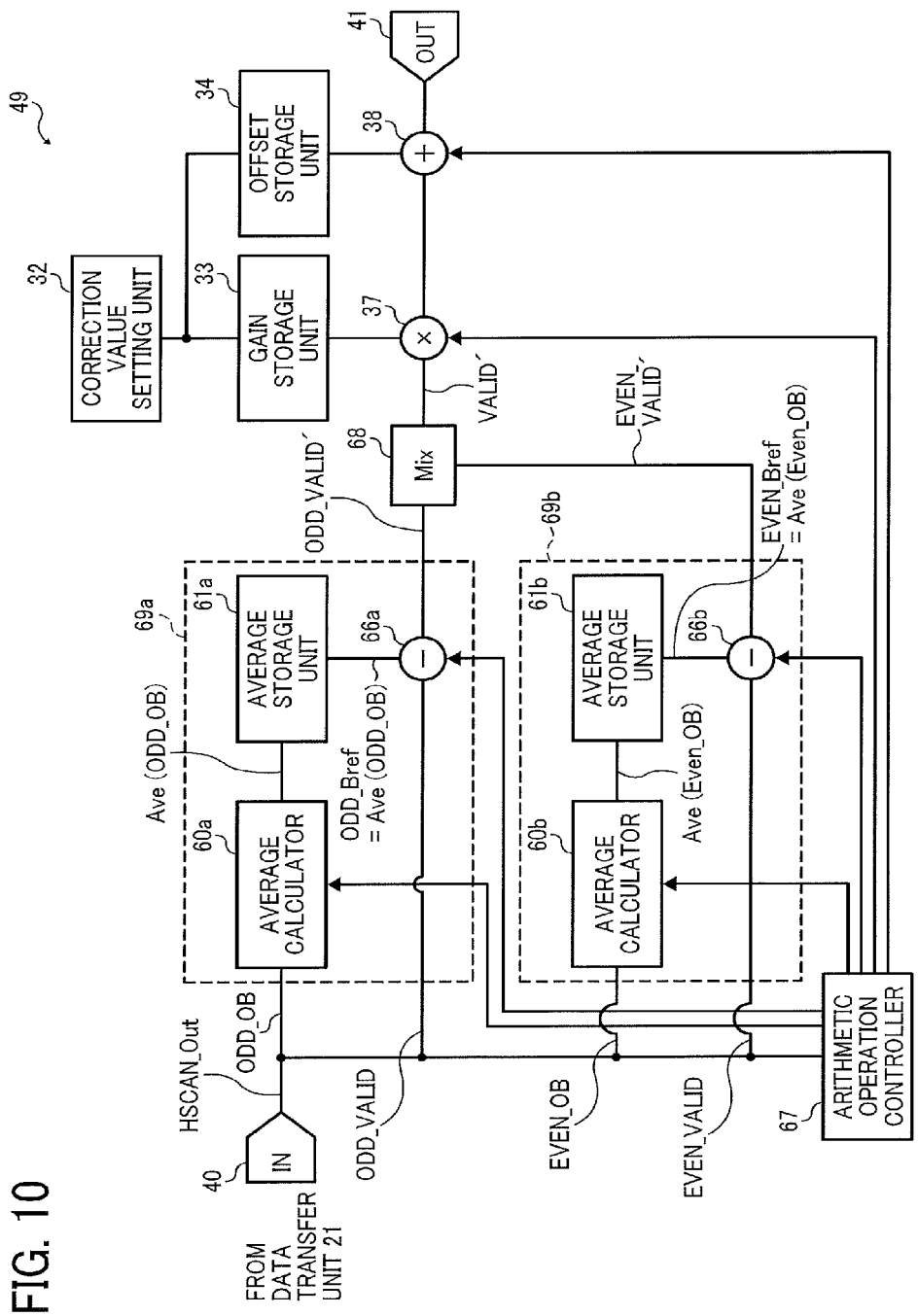
FIG. 10 is a block diagram illustrating the configuration of an arithmetic processing unit of the solid-state imaging device.

Next, the configuration and the operation of the arithmetic processing unit 49 will be described using FIG. 10. FIG. 10 is a block diagram illustrating the detailed configuration of the arithmetic processing unit 49. The arithmetic processing unit 49 performs black level correction by applying different reference black levels Bref for items of image data I(x) of the odd-number pixel 22o and the even-number pixel 22e, which are obtained at different time points.

The arithmetic processing unit 49 is different from the arithmetic processing unit 19 described in the first embodiment in the point that the arithmetic processing unit 49 includes an odd-number-pixel black level correction unit 69a for performing black level correction for the odd-number pixel 22o, and an even-number-pixel black level correction unit 69b for performing black level correction for the even-number pixel 22e.

The odd-number-pixel black level correction unit 69a includes an average calculator 60a (reference black level estimating unit), an average storage unit 61a, and a subtraction processor 66a (level correction unit).

The average calculator 60a performs average calculation of light-blocked data ODD_OB of the odd-number pixel 22o to calculate a reference black level ODD_Bref of the odd-number pixel 22o.

The average storage unit 61a stores the reference black level ODD_Bref of the odd-number pixel 22o.

The subtraction processor 66a performs subtraction to subtract the reference black level ODD_Bref of the odd-number pixel 22o from valid data ODD_VALID of the odd-number pixel 22o to calculate corrected valid data ODD_VALID' of the odd-number pixel 22o.

The even-number-pixel black level correction unit 69b includes an average calculator 60b (reference black level estimating unit), an average storage unit 61b, and a subtraction processor 66b (level correction unit).

The average calculator 60b performs average calculation of light-blocked data EVEN_OB of the even-number pixel 22e to calculate a reference black level EVEN_Bref of the even-number pixel 22e.

The average storage unit 61b stores the reference black level EVEN_Bref of the even-number pixel 22e.

The subtraction processor 66b performs subtraction to subtract the reference black level EVEN_Bref of the even-number pixel 22e from valid data EVEN_VALID of the even-number pixel 22e to calculate corrected valid data EVEN_VALID' of the even-number pixel 22e.

The arithmetic processing unit 49 further includes a mix circuit 68, unlike the arithmetic processing unit 19. The mix circuit 68 rearranges the results of black level correction performed separately for the odd-number pixel 22o and the even-number pixel 22e in the following order: the corrected valid data ODD_VALID' of the odd-number pixel 22o, and the corrected valid data EVEN_VALID' of the even-number pixel 22e. The arithmetic processing unit 49 outputs corrected valid data VALID', which has been subjected to black level correction and in which there is no distinction between the odd-number pixel 22o and the even-number pixel 22e, to the output terminal 41.

The reading controller 18 (see FIG. 1) reads the image data I(x) from the data transfer unit 21 in the following order: the light-blocked data ODD_OB of the odd-number pixel 22o, the valid data ODD_VALID of the odd-number pixel 22o, the light-blocked data EVEN_OB of the even-number pixel 22e, and the valid data EVEN_VALID of the even-number pixel 22e. In this manner, reading the valid data (ODD_VALID and EVEN_VALID) after reading the light-blocked data (ODD_OB and EVEN_OB) is the same as the first embodiment.

An arithmetic operation controller 67 monitors the image output signal HSCAN_Out input to the arithmetic processing unit 49 and checks from which pixel 22 the image output signal HSCAN_Out has been received. When the light-blocked data ODD_OB of the odd-number pixel 22o is received, the odd-number-pixel black level correction unit 69a performs average calculation. When the valid data ODD_VALID of the odd-number pixel 22o is received, the odd-number-pixel black level correction unit 69a performs black level correction. Furthermore, when the light-blocked data EVEN_OB of the even-number pixel 22e is received, the even-number-pixel black level correction unit 69b performs average calculation. When the valid data EVEN_VALID of the even-number pixel 22e is received, the even-number-pixel black level correction unit 69b performs black level correction.

Because the valid data ODD_VALID of the odd-number pixel 22o and the light-blocked data ODD_OB of the odd-number pixel 22o are subjected to AD conversion at the same time (t=t0), similar black level variations occur. Likewise, because valid data EVEN_VALID of the even-number pixel 22e and the light-blocked data EVEN_OB of the even-number pixel 22e are subjected to AD conversion at the same time (t=t0+Δ), similar black level variations occur. Therefore, when the reference black level ODD_Bref of the odd-number pixel 22o and the reference black level EVEN_Bref of the even-number pixel 22e are separately calculated and black level correction is performed, variations of both the reference black levels ODD_Bref and EVEN_Bref of the odd- and even-number pixels 22o and 22e are canceled out, thereby obtaining the corrected valid data VALID' with an even black level.

Although the exemplary case has been described where AD conversion is performed at different time points in accordance with the position of a pixel 22 of interest, the same advantageous effects are achieved when analog signal processing is performed at different time points, besides digital signal processing. That is, the present embodiment is applicable to the case where analog voltage signals are read from pixels 22 at different time points, or the case where analog signal processing such as CDS is performed at different time points.

Figure 11:
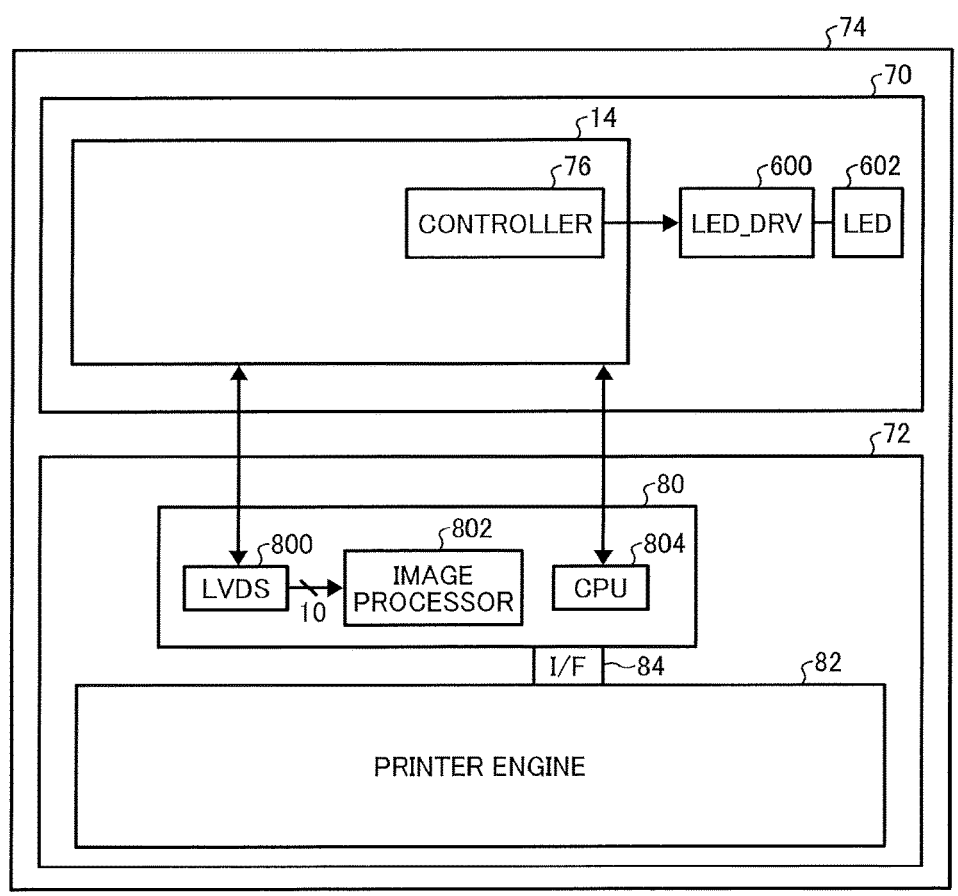
FIG. 11 is a diagram illustrating the outline of an image forming apparatus including an image reading device including the solid-state imaging device.

Next, an image forming apparatus including an image reading device including the solid-state imaging device 50a according to the first embodiment will be described. FIG. 11 is a diagram illustrating the outline of an image forming apparatus 74 including an image reading device 70 including the photoelectric transducer 14, for example. The image forming apparatus 74 is, for example, a copy machine or a multifunction peripheral including the image reading device 70 and an image forming unit 72.

The image reading device 70 includes the photoelectric transducer 14 (solid-state imaging device 50a), a light-emitting diode (LED) driver (LED_DRV) 600, and an LED 602. The LED driver 600 drives the LED 602 in synchronization with the horizontal sync signal LINE_SYNC output by a controller 76. The LED 602 irradiates a document with light. The photoelectric transducer 14 receives the light reflected from the document in synchronization with the horizontal sync signal LINE_SYNC or the like, generates electric charge with the use of a photoelectric converting function, and starts accumulating the electric charge. The photoelectric transducer 14 (solid-state imaging device 50a) performs AD conversion and the above-described black level correction, and then outputs the image data to the image forming unit 72 through a parallel-serial converting circuit.

The image forming unit 72 includes a processor 80 and a printer engine 82. The processor 80 and the printer engine 82 are connected through an interface (I/F) 84.

The processor 80 includes a low voltage differential signaling (LVDS) unit 800, an image processor 802, and a central processing unit (CPU) 804. The CPU 804 controls the components of the image forming apparatus 74, such as the photoelectric transducer 14. The CPU 804 (or the controller 76) applies control to the individual photosensitive elements to start generating electric charge in accordance with the amount of received light substantially at the same time.

The photoelectric transducer 14 outputs, for example, image data of an image read by the image reading device 70, a line sync signal, and a transfer clock to the LVDS unit 800. The LVDS unit 800 converts the received image data, line sync signal, and transfer clock to parallel 10-bit data. The image processor 802 performs image processing using the converted 10-bit data and outputs image data and the like to the printer engine 82. The printer engine 82 performs printing using the received image data.

Although the example has been described in the above-described embodiment where a solid-state imaging device according to an embodiment of the present invention is applied to the image forming apparatus 74 including the image reading device 70, the solid-state imaging device is applicable to any image forming apparatus such as a copy machine, a printer, a scanner device, or a facsimile machine.

According to the solid-state imaging device 50a according to the present embodiment, the horizontal reading unit 17 (signal reading unit) simultaneously converts electric charge Q accumulated by pixels 22 belonging to the left light-blocked area 10L (first light-blocked area), the valid area 10C, and the right light-blocked area 10R (second light-blocked area), which are arranged along one direction, to image data I(x), and reads light-blocked data OB obtained from the left light-blocked area 10L and the right light-blocked area 10R and valid data VALID obtained from the valid area 10C in units of pixels 22. The average calculator 30 (reference black level estimating unit) estimates the reference black level Bref of the light-blocked data OB. On the basis of the estimated reference black level Bref, the subtraction processor 36 (level correction unit) corrects the size of the valid data VALID, converted simultaneously with the light-blocked data OB used in estimating the reference black level Bref, among items of valid data VALID obtained from pixels 22 belonging to the valid area 10C. In doing so, even when noise occurs differently in each line or at each time imaging is performed, an even image can be obtained by performing accurate black level correction.

According to the solid-state imaging device 50a according to the present embodiment, the horizontal reading unit 17 (signal reading unit) reads light-blocked data OB obtained from pixels 22 belonging to the left light-blocked area 10L (first light-blocked area) and the right light-blocked area 10R (second light-blocked area), which are arranged along one direction, before reading valid data VALID obtained from pixels 22 belonging to the valid area 10C. In doing so, even when the reference black level Bref varies in each read line, accurate black level correction can be performed.

Furthermore, according to the solid-state imaging device 50a according to the present embodiment, the average calculator 30 (reference black level estimating unit) regards the average Ave(OB) of the light-blocked data OB obtained from pixels 22 belonging to the left light-blocked area 10L (first light-blocked area) and the right light-blocked area 10R (second light-blocked area) as the reference black level Bref. In doing so, effects of variations in image sensors or a later-stage signal processing circuit can be reduced.

According to the solid-state imaging device 50a according to the present embodiment, the average calculator 30 (reference black level estimating unit) regards the average Ave(L_OB) of the left light-blocked data L_OB obtained from pixels 22 belonging to the left light-blocked area 10L (first light-blocked area) as the reference black level Bref of the left valid data VALIDl obtained from pixels 22 belonging to the left-portion valid area 10Cl (first partial valid area) which is part of the valid area 10C and which is adjacent to the left light-blocked area 10L. Meanwhile, the average calculator 30 (reference black level estimating unit) regards the average Ave(R_OB) of the right light-blocked data R_OB obtained from pixels 22 belonging to the right light-blocked area 10R (second light-blocked area) as the reference black level Bref of the right valid data VALIDr obtained from pixels 22 belonging to the right-portion valid area 10Cr (second partial valid area) which is part of the valid area 10C and which is adjacent to the right light-blocked area 10R. The average calculator 30 (reference black level estimating unit) regards the average Ave(OB) of the light-blocked data OB obtained from pixels 22 belonging to the left light-blocked area 10L and the right light-blocked area 10R as the reference black level Bref of the center valid data VALIDc obtained from pixels 22 belonging to the center-portion valid area 10Cc (third partial valid area) which is part of the valid area 10C and which is neither adjacent to the left light-blocked area 10L nor to the right light-blocked area 10R. In doing so, when the black level, which depends on the position of a pixel 22 of interest, varies from the left end to the right end of the valid area 10C, this black level variation in the valid area 10C can be predicted and corrected using the positional relationship between the pixel 22 of interest and the left light-blocked area 10L/right light-blocked area 10R.

According to the solid-state imaging device 50a according to the present embodiment, the average calculator 30 (reference black level estimating unit) regards, as the reference black level Bref, the average Ave(OB) of the light-blocked data OB obtained only from pixels 22 belonging to the inner areas Zr and Zl not adjacent to end portions, among pixels 22 belonging to the left light-blocked area 10L (first light-blocked area) and the right light-blocked area 10R (second light-blocked area). In doing so, the effect of a noise source near the left light-blocked area 10L and the right light-blocked area 10R can be reduced when performing black level correction.

According to the solid-state imaging device 50b according to the present embodiment, the average calculators 60a and 60b (reference black level estimating unit) respectively estimate the reference black level ODD_Bref of the light-blocked data ODD_OB of the odd-number pixel 22o and the reference black level EVEN_Bref of the light-blocked data EVEN_OB of the even-number pixel 22e whenever the light-blocked data ODD_OB and EVEN_OB are obtained. On the basis of the estimated reference black levels ODD_Bref and EVEN_Bref, the subtraction processors 66a and 66b (level correction unit) correct the size of the valid data ODD_VALID and EVEN_VALID obtained simultaneously with the light-blocked data ODD_OB and EVEN_OB, respectively, used in estimating the reference black levels ODD_Bref and EVEN_Bref. In doing so, variations of the reference black levels ODD_Bref and EVEN_Bref of the odd-number pixel 22o and the even-number pixel 22e, for which AD conversion is performed at different times, are canceled out, thereby obtaining the corrected valid data VALID' with an even black level.

Because the image reading device 70 according to the present embodiment includes the solid-state imaging device 50a, image data read by the image reading device 70 is output after being subjected to black level correction performed by the solid-state imaging device 50a. Therefore, image data whose black level variations are corrected can be obtained.

Furthermore, in the image forming apparatus 74 according to the present embodiment, the image reading device 70 reads image data, the solid-state imaging device 50a corrects the black level of the image data, and the image forming unit 72 prints the corrected image data. Therefore, image data whose black level variations are corrected can be printed.

Although the embodiments have been described above, the specific configurations of the components and the details of processing are not limited to those described in the embodiments.

For example, although a solid-state image sensor with a one-dimensional array has been described in the above-described embodiments, the details of the embodiments are similarly applicable to a solid-state image sensor with a two-dimensional array including a plurality of lines.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A system including a solid-state image sensor in which a plurality of pixels are arranged along at least one direction, the pixels being configured to convert incident light to electric charge whose amount is in accordance with the amount of the incident light and to accumulate the electric charge, the system comprising:
   a valid area including pixels that are not shielded from light;
   a first light-blocked area including pixels that are shielded from light and that are arranged at one of two end portions of the valid area;
   a second light-blocked area including pixels that are shielded from light and that are arranged at the other end portion of the valid area;
   a photoelectric transducer including
      an analog-to-digital converting unit configured to convert the electric charge accumulated respectively by the pixels belonging to the first light-blocked area, the valid area, and the second light-blocked area, to first bit size image data at least at a time for an individual line of pixels,
      a signal reading unit configured to read, among items of the image data, light-blocked data obtained from the first light-blocked area and the second light-blocked area, and valid data obtained from the valid area, in units of pixels,
      a reference black level estimating unit configured to estimate a reference black level of the light-blocked data for the individual line of pixels whenever the light-blocked data is obtained,
      a level correction unit configured to correct, based on the estimated reference black level, a size of the valid data obtained simultaneously with the light-blocked data used in estimating the reference black level; and
   circuitry configured to convert the first bit size image data, after the correction to the size of the valid data has been performed, to second bit size image data that is smaller than the first bit size image data, and output the second bit size image data to an image processor,
   wherein the reference black level estimating unit is configured to use an average of the light-blocked data as the reference black level used by the level correction unit to correct the valid data, and
   wherein the reference black level estimating unit is configured to use an average of the light-blocked data obtained from pixels belonging to an inner area not adjacent to end portions in the one direction, among the pixels belonging to the first light-blocked area and the second light-blocked area, as the reference black level used by the level correction unit to correct the valid data.

2. The system according to claim 1, wherein the signal reading unit is configured to read the light-blocked data obtained from the pixels belonging to the first light-blocked area and the second light-blocked area, which are arranged along the one direction, before reading the valid data obtained from the pixels belonging to the valid area and obtained simultaneously with the light-blocked data.

3. The system according to claim 1, wherein:
   the reference black level estimating unit is configured to use an average of the light-blocked data obtained from the pixels belonging to the first light-blocked area as the reference black level used by the level correction unit to correct the valid data obtained from pixels belonging to a first partial valid area that is part of the valid area and that is adjacent to the first light-blocked area,
   the reference black level estimating unit is configured to use an average of the light-blocked data obtained from the pixels belonging to the second light-blocked area as the reference black level used by the level correction unit to correct the valid data obtained from pixels belonging to a second partial valid area that is part of the valid area and that is adjacent to the second light-blocked area, and
   the reference black level estimating unit is configured to use an average of the light-blocked data obtained from the pixels belonging to the first light-blocked area and the second light-blocked area as the reference black level used by the level correction unit to correct the valid data obtained from pixels belonging to a third partial valid area that is part of the valid area and that is neither adjacent to the first light-blocked area nor to the second light-blocked area.

4. The system according to claim 1, wherein the first bit size image data is 12-bit image data and the second bit size image data is 10-bit image data.

5. An image reading device comprising:
   the system according to claim 1.

6. An image forming apparatus comprising:
   the image reading device according to claim 5; and
   an image forming unit that forms an image based on an output of the image reading device.

* * * * *